(No Model.) 2 Sheets—Sheet 1.

M. MOSKOWITZ.
STORAGE BATTERY.

No. 537,989. Patented Apr. 23, 1895.

WITNESSES:
Wm. H. Canfield, Jr.
H. W. Marsh

INVENTOR:
Morris Moskowitz,
BY Fred C. Fraentzel, ATT'Y.

(No Model.) 2 Sheets—Sheet 2.
M. MOSKOWITZ.
STORAGE BATTERY.
No. 537,989. Patented Apr. 23, 1895.
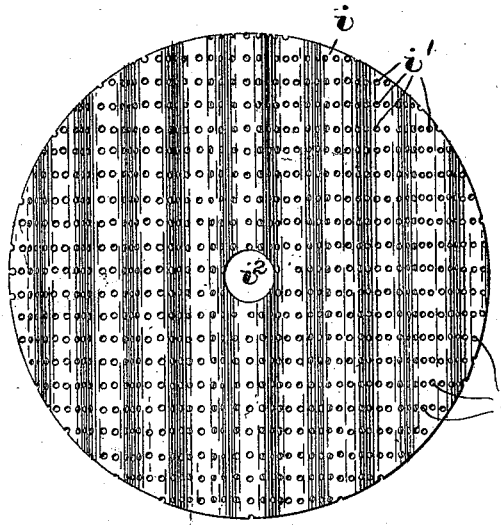
Fig. 5
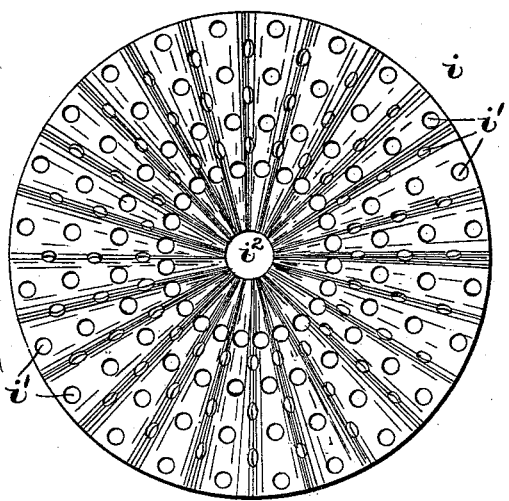
Fig. 6
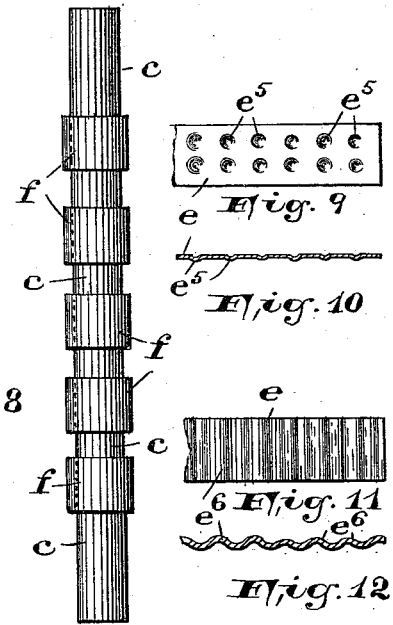
Fig. 8
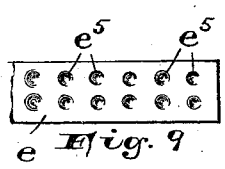
Fig. 9
Fig. 10
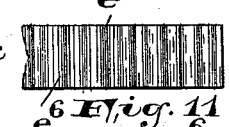
Fig. 11
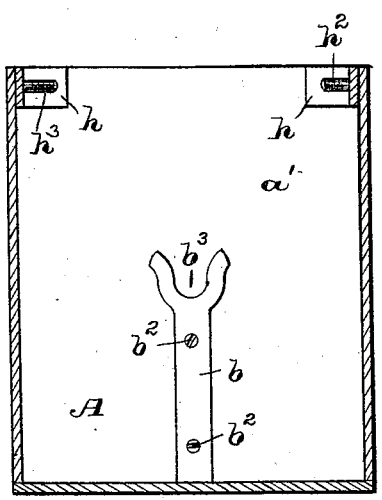
Fig. 7
Fig. 12
WITNESSES:
Wm. H. Caufield, Jr.
H. N. Marsh
INVENTOR:
Morris Moskowitz,
BY Fred H. Fraentzel, ATT'Y.

United States Patent Office.

MORRIS MOSKOWITZ, OF NEWARK, NEW JERSEY, ASSIGNOR, BY DIRECT AND MESNE ASSIGNMENTS, TO HIMSELF, LEON D. ADLER, OF SAME PLACE, A. S. ADLER, OF PHILADELPHIA, PENNSYLVANIA, AND THEODORE W. MYERS, OF NEW YORK, N. Y.

STORAGE-BATTERY.

SPECIFICATION forming part of Letters Patent No. 537,989, dated April 23, 1895.

Application filed May 7, 1894. Serial No. 510,307. (No model.)

*To all whom it may concern:*

Be it known that I, MORRIS MOSKOWITZ, a citizen of the United States, residing at Newark, in the county of Essex and State of New Jersey, have invented certain new and useful Improvements in Storage-Batteries; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to provide a novel form of storage battery, and is especially designed to produce a battery in which the plates or elements are spirally wound in the manner of a clock spring, to allow a large amount of contraction and expansion of the elements and thereby preventing what is ordinarily termed "buckling."

The invention also has for its objects to materially simplify the construction and arrangement of parts in storage batteries; to suspend the elements to prevent an accumulation of active material on the elements, which tends to bridge across from element to element in the bottom of the cell, and thereby form short circuits; to increase the usefulness of the apparatus by increasing the active surfaces of the elements in a small cell; to permit the free circulation of acid between the spirally arranged surfaces of the elements; and to otherwise improve storage batteries, as will hereinafter more fully appear.

The several objects of my invention I accomplish in the manner and by the means hereinafter described and claimed, reference being had to the accompanying drawings, in which—

Figure 1:
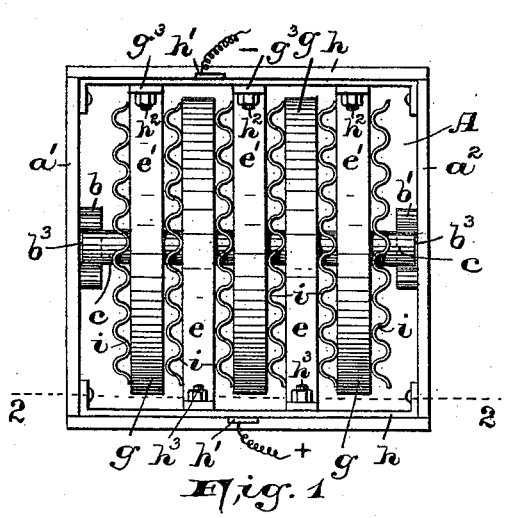
Figure 2:
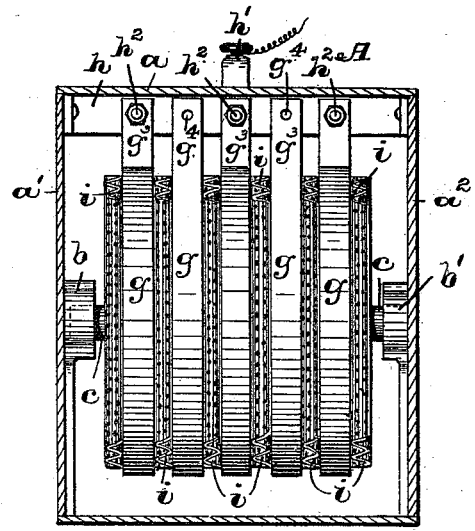
Figure 3:
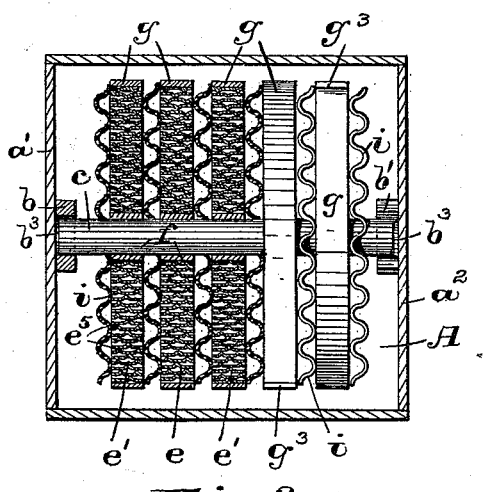
Figure 4:
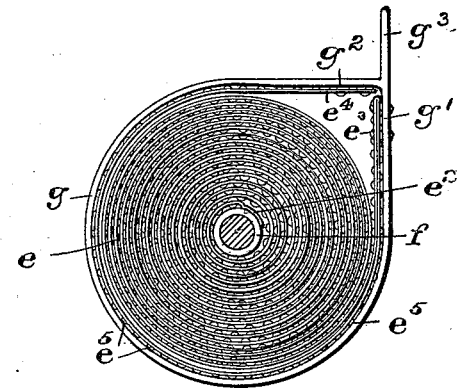

Figure 1 is a top view of my novel form of storage battery with the cover removed from the cell. Fig. 2 is a vertical section of the same, taken on line 2—2 in Fig. 1; and Fig. 3 is a horizontal section of the battery. Fig. 4 is a side view of one of the elements, illustrating the spiral feature of the same. Fig. 5 is a side view of one of the separating disks arranged between two elements; and Fig. 6 is a similar view of a separating disk of a slightly modified form of construction. Fig. 7 is a vertical cross section of the cell, illustrating in connection with the same, a support for the shaft or bar on which the elements and separating disks of the battery are arranged; and Fig. 8 is a view of said shaft or bar. Figs. 9 and 10 are detail views of parts of the elements, in plan and vertical section respectively, illustrating an arrangement of indentations on one side and projections on the other side, and Figs. 11 and 12 are similar views of part of an element, provided with a corrugated or fluted surface.

Similar letters of reference are employed in the said above described views to indicate corresponding parts.

In said drawings, A is the cell or casing, which may be made of hard rubber, or glass, or any other suitable non-conducting material, provided with the usual form of cover or lid $a$, as will be seen from Fig. 2. Said cell or casing A is provided on two of its opposite sides, as $a'$, and $a^2$, with suitable bearings or supports $b$ and $b'$ of any well known form and construction, which may be formed integral with the sides, or may be secured thereto by means of screws $b^2$, as shown in Fig. 7. In a crotch $b^3$ in each of said supports is loosely placed therein, a bearing bar or shaft $c$, which is preferably made of hard rubber, but may be made of any other suitable non-conducting material, as will be evident. Upon said bar or shaft $c$ I arrange the positive elements $e$ and the negative elements $e'$, alternately, as will be seen from Figs. 1, 2 and 3, and of which there may be any suitable number, according to the size and strength of the battery required.

Each element is made in the form of a band or ribbon, of a pliable metal, such as lead; but any other suitable material may be used. These bands or ribbons are preferably doubled upon each other, as shown in Fig. 4, and are secured at their inner ends $e^2$ to a soft metal collar $f$ on said bearing bar $c$. Said ends $e^2$ may be soldered to said collars $f$ or they may be riveted or otherwise secured thereto, as will be evident. The said bands or ribbons $e$ and $e'$, forming the elements, are then wound spirally, in the manner of a clock spring, around said collars $f$, in such a manner that each band has two free ends $e^3$ and $e^4$.

Each spirally wound element is placed in a suitable frame or casing $g$ of lead, or other conducting material, the form and shape of which will be seen from Fig. 4, and the ends $e^3$ and $e^4$ are "lead burnt," or fastened to the portions $g'$ and $g^2$ of said frame $g$ by means of rivets or screws, as shown. Each frame or casing $g$ is provided with a fastening arm or portion $g^3$ having a hole $g^4$ therein, whereby said arm can be forced over the holding screws $h^2$ and $h^3$ on a bar $h$, secured to the sides of the cell A, as clearly shown in Fig. 7. Said bars $h$, of which there are two, are made of any suitable conducting material, such as brass or white metal, the latter being preferred, as it is not so liable to be attacked by the acid used in the construction of the battery. To firmly secure the ends $g^3$ against said bars $h$, suitable nuts are screwed upon said holding screws, but said ends $g^3$ may be soldered fast upon said bars $h$, as will be evident. Each bar $h$ is provided with a binding post $h'$, see Fig. 1, which form the positive and negative poles of the battery.

To permit a free circulation of the acid used in the battery, between the wound surfaces of said ribbons $e$ and $e'$, the surfaces of said ribbons are provided with projections $e^5$, as shown more particularly in Figs. 9 and 10, or with corrugations or flutings $e^6$, as shown in Figs. 11 and 12, which prevent the close contact between the surfaces of said ribbons or bands.

The several elements on the bearing bar or shaft $c$ are separated from one another by suitable disks $i$ of a non-conducting material, which disks are corrugated or fluted, as indicated in Figs. 5 or 6, and are provided with holes or perforations $i'$ to permit the flow of the liquid in the cell through said disks. Said disks are provided with a central hole $i^2$, whereby each disk can be arranged on the shaft $c$ between two collars $f$, and between the elements, as clearly shown in Figs. 1, 2 and 3.

By the arrangement of the pebbled surface of the element, as shown in Figs. 9 and 10, or by the corrugations, illustrated in Figs. 11 and 12, a free circulation of the acid used is permitted between the surfaces of said ribbons or bands $e$ and $e'$, and furthermore, an increased surface of metal is thereby presented to the action of the acid, which facilitates the early completion of the battery, by more quickly taking up a deposit of active material than a smooth surface.

Owing to the arrangement of the bearing bar or shaft $c$ in the supports on the opposite sides of the casing or cell A, and owing to the spring-like action of the spirally wound elements on said shaft, said shaft has a partial rotation in its bearings and will turn as the elements expand or contract.

It will be readily understood, that the arrangement and combination of the parts comprised in my novel form of storage battery can be modified, without departing from the scope of my invention, the essential feature of which is the arrangement of spirally wound elements, to permit contraction and expansion, without "buckling," and further, to so construct the surfaces of the elements, as to permit a free circulation of acid between the surfaces of the elements and to enable them to more quickly take up the deposit of active material.

It is due to the corrugated or fluted surfaces of the insulating disks $i$, that all accumulation of excessive active material on the positive elements of the battery, will drop to the bottom of the cell or casing A, and hence can not bridge over the space between a positive and negative element to form a short circuit.

It will be noticed that by the suspension of the elements in my form of battery, a large space is the result between the bottom of the cell and the lower portions of said elements, thereby allowing of a great accumulation of such deposited material, before contact can be made between any two adjacent elements.

Having thus described my invention, what I claim is—

1. A storage battery, comprising therein, a single cell or casing A, bearings or supports in said casing, a bearing-bar or shaft therein, and elements on said shaft, said elements being spirally wound to permit free action of expansion and contraction, and having their free ends rigidly connected with the casing substantially as and for the purposes set forth.

2. A storage battery, comprising therein, a single cell or casing A, bearings or supports in said casing, a bearing-bar or shaft therein, and elements on said shaft, said elements being spirally wound to permit free action of expansion and contraction, and having their free ends rigidly connected with the casing and separating disks of a non-conducting material, arranged substantially as and for the purposes set forth.

3. A storage battery, comprising therein, a single cell or casing A, bearings or supports in said casing, a bearing-bar or shaft therein, and elements on said shaft, said elements being spirally wound to permit free action for expansion and contraction, and having their free ends rigidly connected with the casing, and said elements having projections or corrugations, substantially as and for the purposes set forth.

4. A storage battery, comprising therein, a single cell or casing A, bearings or supports in said casing, a bearing-bar or shaft therein, and elements on said shaft, said elements being spirally wound to permit free action for expansion and contraction, and having their free ends rigidly connected with the casing, said elements having projections or corrugations, and separating disks of a non-conducting material, arranged, substantially as and for the purposes set forth.

5. The herein described storage battery, comprising therein, a casing or cell A, bars $h$, bearings or supports in said casing, a bearing-bar or shaft loosely arranged in said bearings or supports, collars $f$ on said shaft, and spirally wound elements connected with said collars $f$ and with said bars $h$, substantially as and for the purposes set forth.

6. The herein described storage battery, comprising therein, a casing or cell A, bars $h$, bearings or supports in said casing, a bearing bar or shaft loosely arranged in said bearings or supports, collars $f$ on said shaft, spirally wound elements connected with said collars $f$ and with said bars $h$, and separating disks on said shaft between said collars and between said elements, substantially as and for the purposes set forth.

In testimony that I claim the invention set forth above I have hereunto set my hand this 18th day of April, 1894.

MORRIS MOSKOWITZ.

Witnesses:
FREDK. C. FRAENTZEL,
LEON D. ADLER.